US 7,945,053 B2

(12) United States Patent
Qi et al.

(10) Patent No.: US 7,945,053 B2
(45) Date of Patent: May 17, 2011

(54) METHODS AND APPARATUS FOR A KEYING MECHANISM FOR END-TO-END SERVICE CONTROL PROTECTION

(75) Inventors: Emily H. Qi, Portland, OR (US); Jesse R. Walker, Portland, OR (US); JR-Shian Tsai, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1057 days.

(21) Appl. No.: 11/435,316

(22) Filed: May 15, 2006

(65) Prior Publication Data

US 2007/0263873 A1 Nov. 15, 2007

(51) Int. Cl.
H04L 9/08 (2006.01)
(52) U.S. Cl. .................. 380/283; 380/277; 380/278
(58) Field of Classification Search .......... 380/277–286, 380/44–47
See application file for complete search history.

(56) References Cited

U.S. PATENT DOCUMENTS

| 5,878,332 | A | * | 3/1999 | Wang et al. | 455/84 |
| 6,278,864 | B1 | * | 8/2001 | Cummins et al. | 455/73 |
| 7,171,001 | B2 | * | 1/2007 | Tuvell et al. | 380/278 |
| 7,567,785 | B2 | * | 7/2009 | Tsai et al. | 455/186.1 |
| 2003/0235305 | A1 | | 12/2003 | Hsu | |
| 2004/0185872 | A1 | | 9/2004 | Emmerson et al. | |
| 2005/0232200 | A1 | * | 10/2005 | Jeong et al. | 370/331 |
| 2006/0099972 | A1 | * | 5/2006 | Nair et al. | 455/458 |
| 2006/0256763 | A1 | * | 11/2006 | Nguyen et al. | 370/338 |
| 2008/0014882 | A1 | * | 1/2008 | Tsai et al. | 455/187.1 |

OTHER PUBLICATIONS

Changhua He, and John C Mitchell, Security Analysis and Improvements for IEEE 802.11i, http://www.isoc.org/isoc/conferences/ndss/05/proceedings/papers/NDSS05-1107.pdf, Electrical Engineering and Computer Science Department, Stanford University.*
Artur Hecker, and Houda Labiod, Pre-Authenticated Signaling in Wireless LANs using 802.1X Access Control, http://ieeexplore.ieee.org/stamp/stamp.jsp?arnumber=01378396, IEEE Communications Society, p. 2180-2184.*
International Search Report mailed on Oct. 23, 2007 for International Application No. PCT/US2007/068763, 6 pgs.

* cited by examiner

*Primary Examiner* — Matthew B Smithers
*Assistant Examiner* — Jing Sims
(74) *Attorney, Agent, or Firm* — Schwabe, Williamson & Wyatt, P.C.

(57) ABSTRACT

Embodiments of the present invention provide methods and apparatus for a keying mechanism for end-to-end service control protection within wireless networks. Other embodiments may be described and claimed.

22 Claims, 5 Drawing Sheets

METHODS AND APPARATUS FOR A KEYING MECHANISM FOR END-TO-END SERVICE CONTROL PROTECTION

TECHNICAL FIELD

Embodiments of the present invention relate to the field of wireless networks, and more particularly, to a keying mechanism for end-to-end service control within wireless networks.

BACKGROUND

As wireless networks, such as, for example, wireless local area networks (WLAN), are now widely deployed in enterprise, numerous application services have been introduced for such networks. For example, location service has been introduced in WLAN for asset tracking, and paging service is being considered to provide deeper power saving for mobile client devices. In such applications, a location service controller and a paging service controller need to advertise or retrieve management/configuration information to/from mobile clients. However, there currently is no secure channel that has been defined between mobile stations and service controllers.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)". For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide methods and apparatus for a keying mechanism for end-to-end service control protection for a wireless network.

Figure 1:
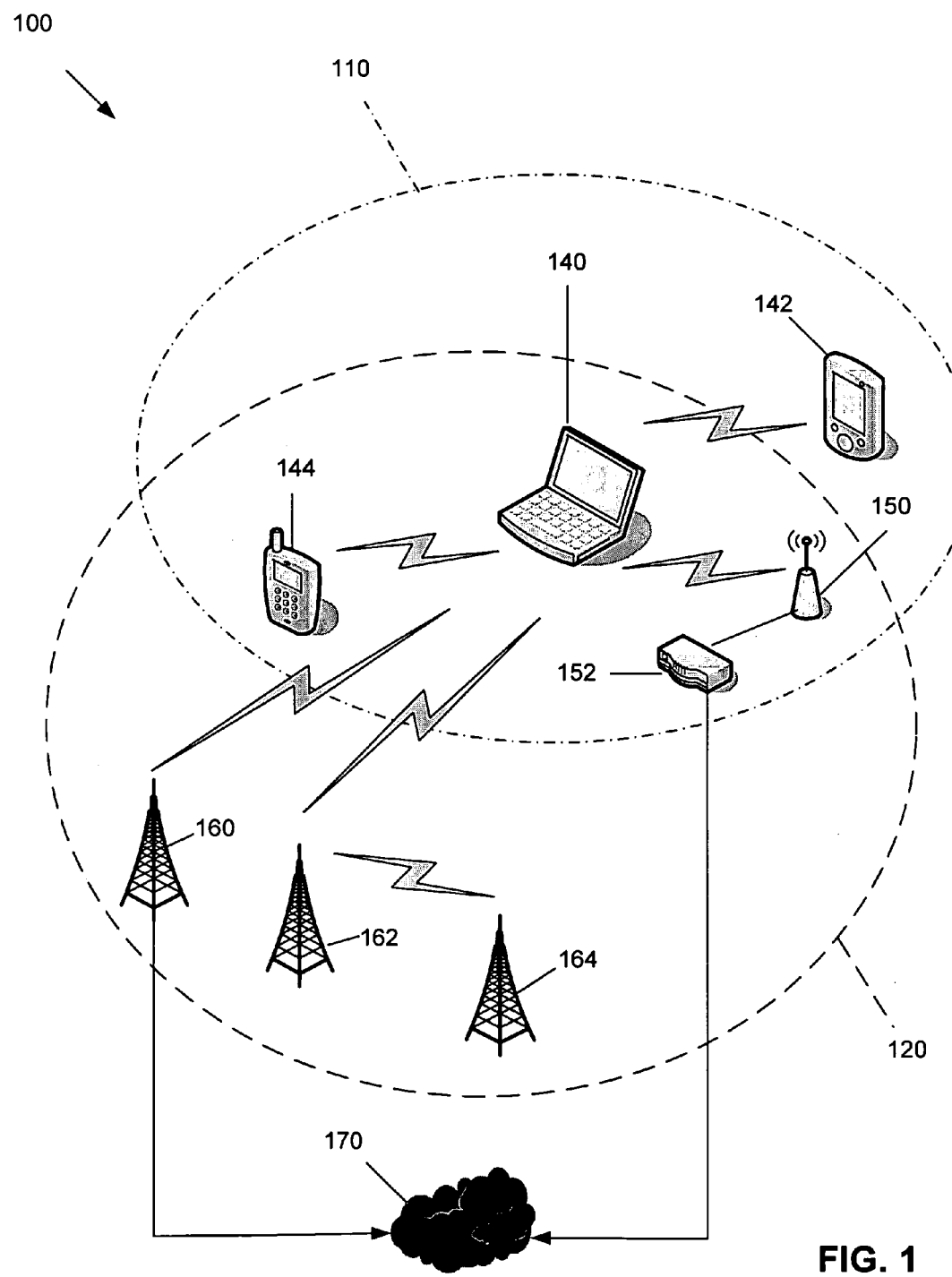
FIG. 1 is a schematic diagram representation of an example wireless communication system in accordance with various embodiments of the present invention.

Referring to FIG. 1, an example wireless communication system 100 may include one or more wireless communication networks, generally shown as 110 and 120. In particular, the wireless communication system 100 may include a wireless local area network (WLAN) 110, and a wireless metropolitan area network (WMAN) 120. Although FIG. 1 depicts two wireless communication networks, the wireless communication system 100 may include additional or fewer wireless communication networks. For example, the wireless communication network 100 may include more or less WLANs, and/or WMANs. The methods and apparatus described herein are not limited in this regard.

The wireless communication system 100 may also include one or more mobile devices, also referred to as subscriber stations, generally shown as 140, 142 and 144. For example, the subscriber stations 140, 142 and 144 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a global positioning satellite (GPS) device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts three subscriber stations, the wireless communication system 100 may include more or less subscriber stations.

The subscriber stations 140, 142 and 144 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links.

In one example, the laptop computer 140 may use direct sequence spread spectrum (DSSS) modulation and/or frequency hopping spread spectrum (FHSS) modulation to implement the WLAN 110 (e.g., modulations in accordance with any one of the 802.11 family of standards developed by the Institute of Electrical and Electronic Engineers (IEEE) and/or variations and evolutions of these standards). For example, the laptop computer 140 may communicate with devices associated with the WLAN 110 such as the handheld computer 142 and/or the smart phone 144 via wireless links. The laptop computer 140 may also communicate with an access point (AP) 150 via a wireless link. Generally, WLANs and WMANs include multiple APs 150. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 120. For example, the laptop computer 140 may operate in accordance with the 802.16 family of standards developed by IEEE to provide for fixed, portable, and/or mobile broadband wireless access (BWA) networks (e.g., the IEEE std. 802.16, published by IEEE 2004) to communicate with base stations, generally shown as 160, 162, and 164, via wireless link(s).

Although some of the above examples are described with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). The methods and apparatus described herein are not limited in this regard.

The WLAN 110 and WMAN 120 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 110 may be operatively coupled to the common public or private network 170 via an AP 150 and/or the router 152. In another example, the WMAN 120 may be operatively coupled to the common public or private network 170 via the base station(s) 160, 162, and/or 164.

The wireless communication system 100 may include other suitable wireless communication networks. For example, the wireless communication system 100 may include a wireless wide area network (WWAN) (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, standards based on these technologies, variations and evolutions of these standards, and/or other suitable wireless communication standards. Although FIG. 1 depicts a WLAN, and a WMAN, the wireless communication system 100 may include other combinations of WLANs, WMANs, and/or WWANs. The methods and apparatus described herein are not limited in this regard.

The wireless communication system 100 may include other WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

In general, the present invention provides a keying mechanism and end-to-end protection for management/configuration messages (also referred to as control messages) that are sent between mobile stations (STA) and service controllers in a wireless network. With the keying mechanism, broadcast/multicast messages that are sent from STA associates to transmitting/receiving access points (APs) are protected.

More particularly, the present invention provides a key hierarchy for end-to-end protection between service controllers and mobile clients. A process, in accordance with various embodiments of the present invention, provides that once the STA completes association (first contact) with an extended service set (ESS), a network authentication server (NAS) distributes a mobile station key (MSK) to a service controller. If there is more than one service controller in the ESS, the NAS distributes the MSK to all of the service controllers.

Figure 2:
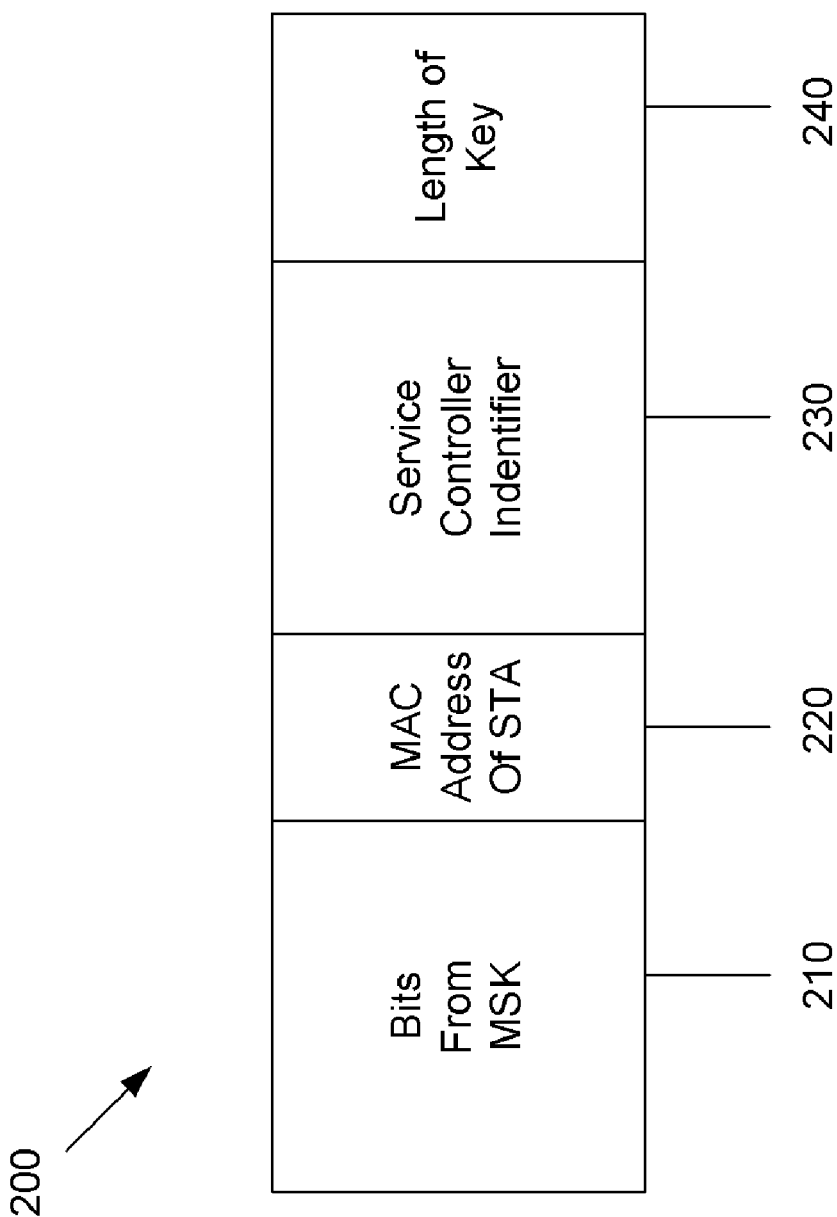
FIG. 2 is schematic diagram representation for a service pairwise key for use in a keying mechanism for end-to-end service control protection for a wireless network in accordance with various embodiments of the present invention.

The service controller/the STA derives a service pairwise key (SPK) from bits 256-511 of the MSK. Alternatively, bits 256-511 of a cached pre-shared key (PSK) may be used. As may be seen in FIG. 2, the SPK 200 is generated via a key derivation function with bits 256-511 of the MSK in a first field 210, the medium access control (MAC) address of the STA in a second field 220, a service controller identifier in a third field 230, and the length of the key in a fourth field 240.

Figure 3:
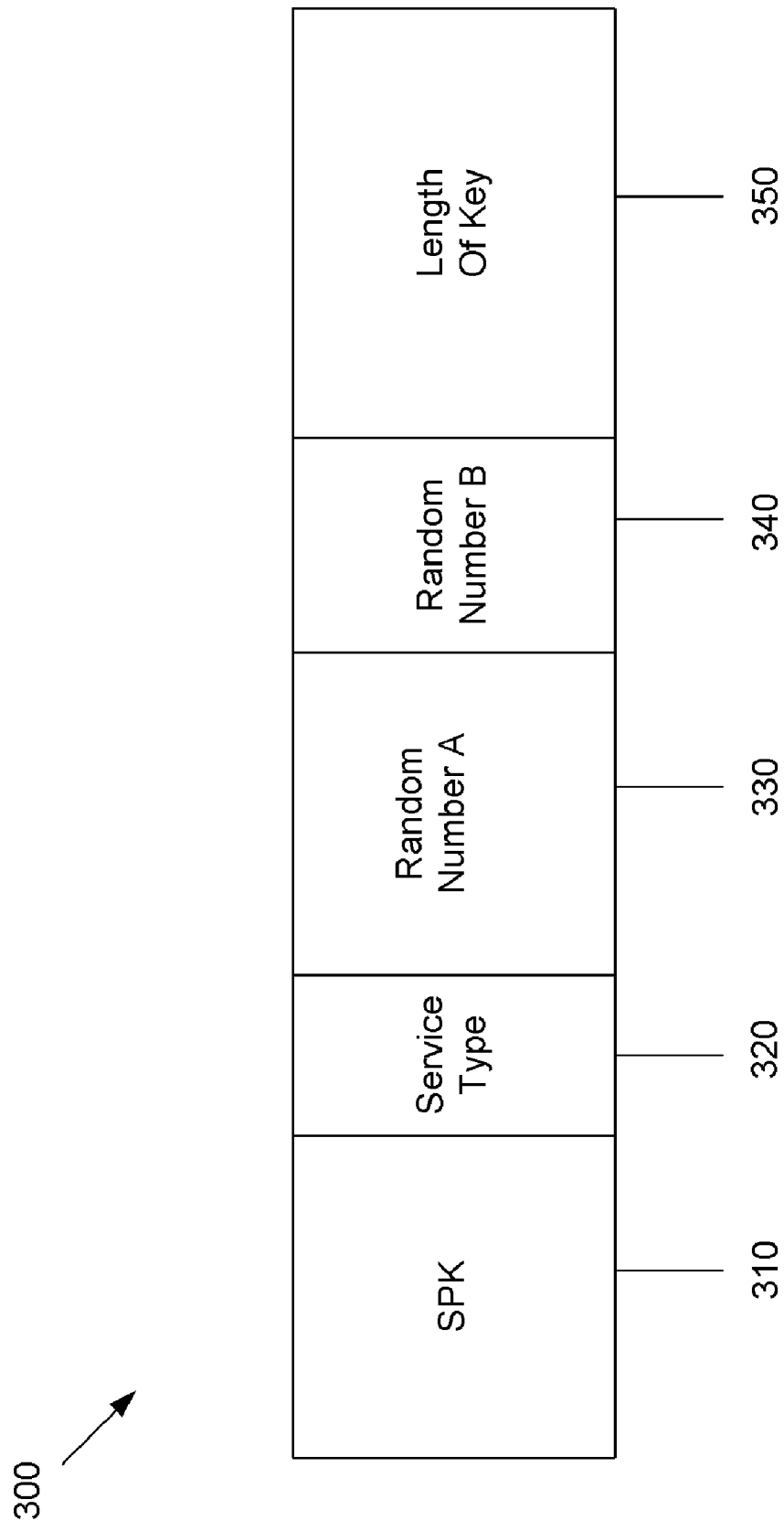
FIG. 3 is schematic diagram representation for a temporal integrity pairwise key for use in a keying mechanism for end-to-end service control protection for a wireless network in accordance with various embodiments of the present invention.

After the service configuration exchange between the STA and the service controller, the service controller and the STA generate a temporal integrity pairwise key (TIPK) from the SPK. As may be seen in FIG. 3, the TIPK 300 is generated via key derivation function with the SPK in a first field 310, a service type indentifier (e.g. "paging service") in a second field 320, a random number A generated at the STA in a third field 330, a random number B generated at the service controller in a fourth field 340, and a length of the key in a fifth field 350.

Thus, the TIPK is a bi-directional key to protect uplink and downlink messages between the STA and the service controller. In accordance with various embodiments of the present invention, an STA may have different TIPKs for different types of service controllers.

Figure 4:
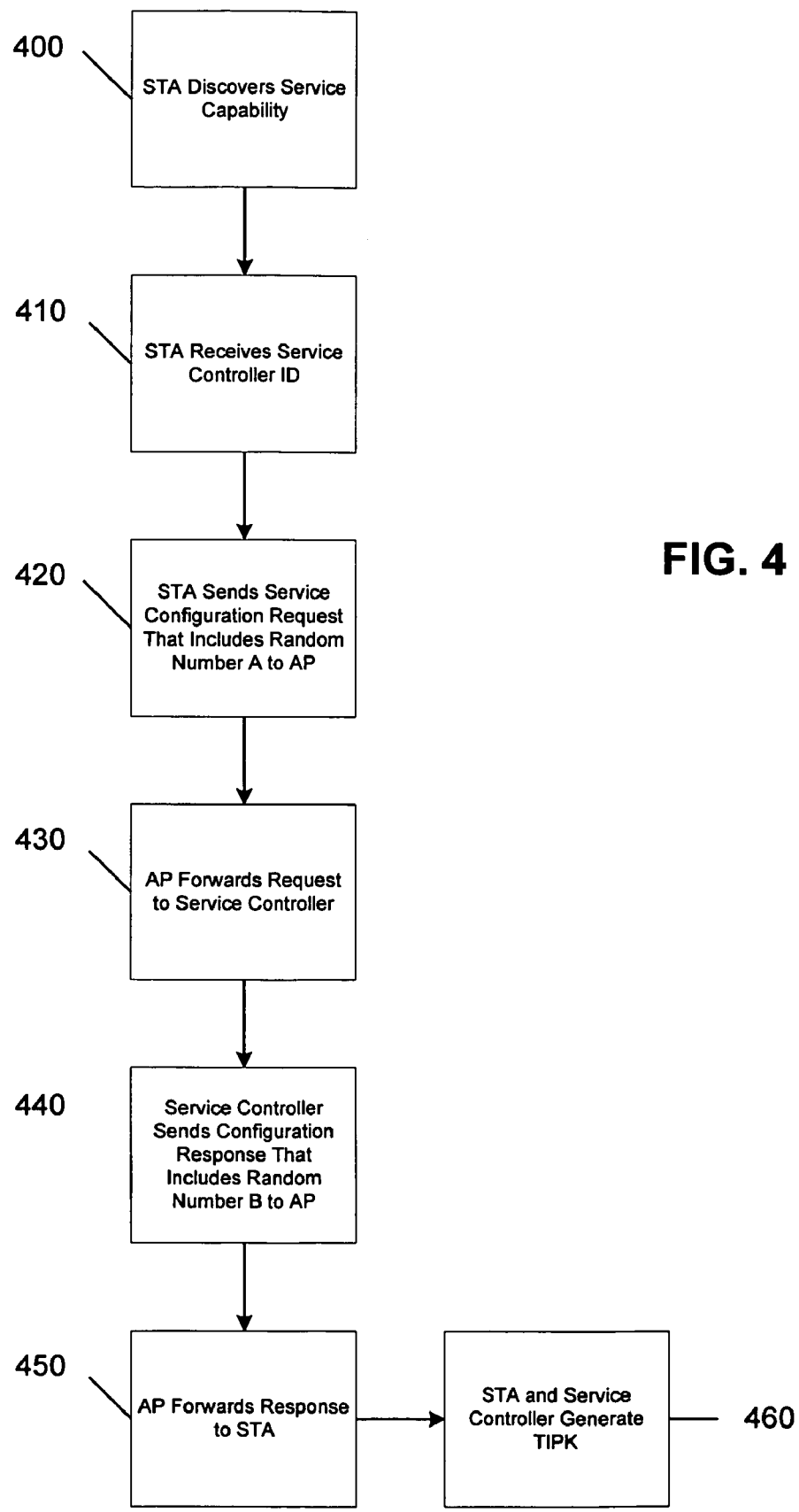
FIG. 4 is a flowchart illustrating an example of a keying mechanism for end-to-end service control protection for a wireless network in accordance with various embodiments of the present invention.

Accordingly, the present invention provides 2-way handshake messages to derive a TIPK between a service controller of a network and a STA. The keying generation and delivery, in accordance with various embodiments of the present invention, is illustrated in FIG. 4. During association (first contact to the ESS), the STA and AP exchange the capability of services for the network, e.g., paging support or location support at block 400. If the ESS supports the specified service type (e.g. paging), the AP provides the STA with the service controller identification (ID) in the association response message at block 410 and the STA will send a service configuration request action frame to the AP at block 420. The service configuration request includes a dialog token, a requested service type, and a random number A. When the AP receives the service configuration request action, at block 430 the AP generates a configuration-request message and forwards it to the corresponding service controller. The configuration-request message includes the random number A and the MAC address of the STA. Once the service controller processes the STA's service configuration request, at block 440 the service controller generates a random number B and sends it to the AP through a configuration-response message. The AP forwards it to the STA through a service configuration response message at block 450. Both the STA and service controller derive and install the TIPK with the random numbers A and B at block 460. In accordance with various embodiments of the present invention, the service configuration request/response action frames are class 3 action frames and may be protected by management frame protection.

Thus, once the TIPK has been generated by the STA and the service controller, the TIPK is used to authenticate messages exchanged between the STA, service controller and any intervening APs. The STA and service controller verify messages received by checking the message integrity code using the TIPK.

A STA generally comprises an omnidirectional antenna, a control block, a transmit block operatively coupled to the control block and antenna, and a receive block operatively coupled to the control block and antenna. At least the transmit block and receive block may be part of a transceiver having at least one common component.

Figure 5:
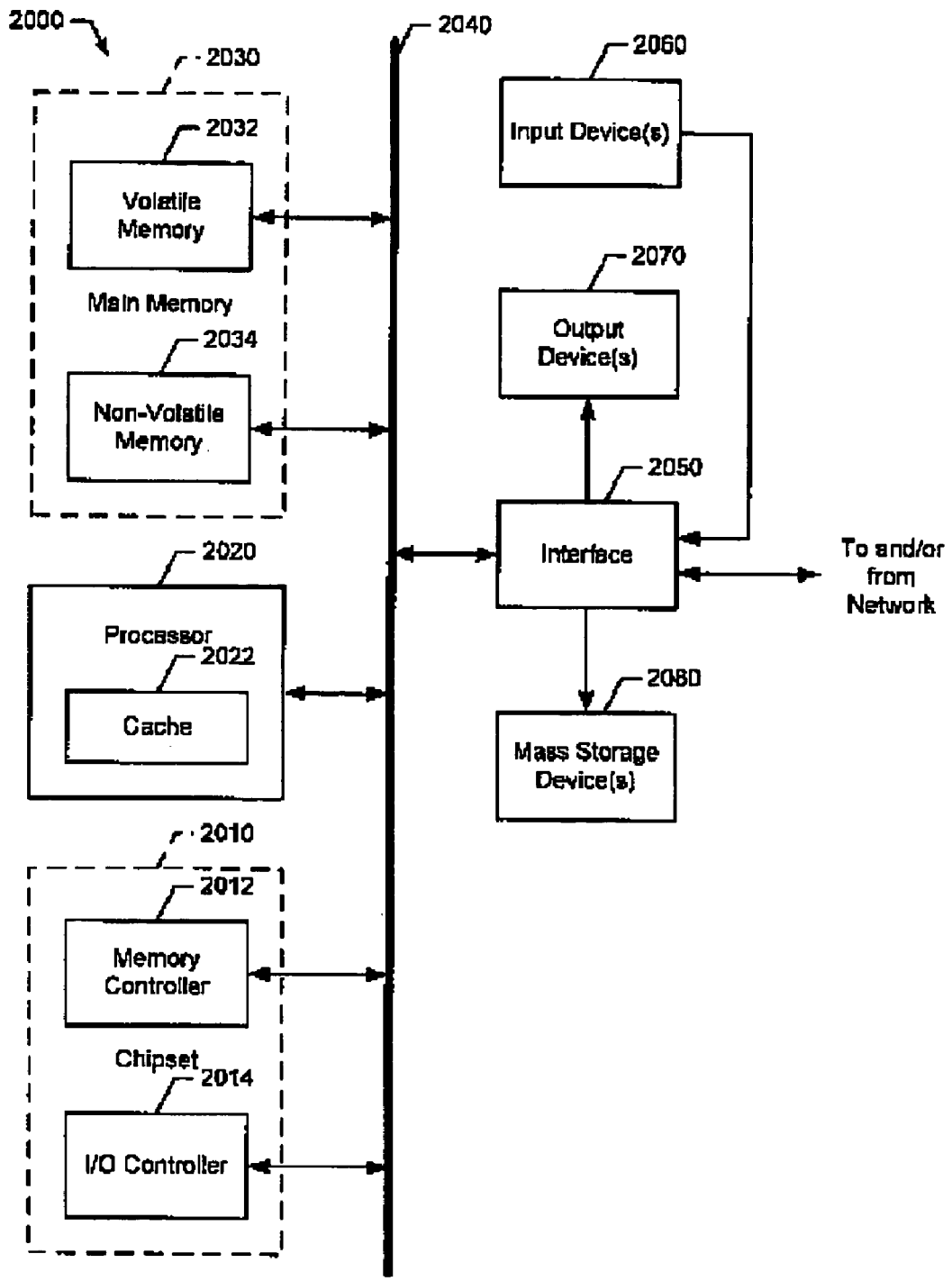
FIG. 5 is a block diagram representation of an example processor system that may be used to practice various aspects of the present invention.

FIG. 5 is a block diagram of an example processor system 2000 adapted to implement the methods and apparatus disclosed herein, in accordance with various embodiments. The processor system 2000 may be a desktop computer, a laptop computer, a handheld computer, a tablet computer, a PDA, a server, an Internet appliance, and/or any other type of computing device. The processor system 2000 may be used as a STA, an AP, or a server hosting the service controller function.

The processor system 2000 illustrated in FIG. 5 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The chipset 2010 may be implemented using one or more Wireless Personal Area Network (WPAN) components, Wireless Local Area Network (WLAN) components, Wireless Metropolitan Area Network (WMAN) components, Wireless Wide Area Network (WWAN) components, and/or other suitable networking components. In particular, in various embodiments designed to be a STA or an AP, the chipset 2010 may be endowed with the teachings of the present invention, implementing selected aspects of the above described keying mechanism. The processor 2020 may be implemented using one or more processors, e.g. those of the Intel® Core™ technology, Intel® Pentium® technology, the Intel® Itanium® technology, the Intel® Centrino™ technology, the Intel® Core™ Duo technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device. In various embodiments designed to be used as a server, suitable for hosting the above described service controller function, main memory 2030 may include (a non-persistent copy of the) instructions implementing all or portions of the above described service controller function.

The processor system 2000 may also include an interface circuit 2050 that is coupled to the bus 2040. The interface circuit 2050 may be implemented using any type of interface standard such as an Ethernet interface, a universal serial bus (USB), a third generation input/output (3GIO) interface, and/or any other suitable type of interface. In various embodiments designed to be a STA or AP, selected aspects of the above described keying mechanism may be implemented in interface circuit 2050, in addition to or in lieu of the endowment in chipset 2010.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives. In various embodiments designed to be used as a server, suitable for hosting the above described service controller function, mass storage device(s) may include (a non-persistent copy of the) instructions implementing all or portions of the above described service controller function.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 5 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
providing, by a first access point (AP) of an extended service set (ESS) of a wireless network to a mobile station (STA), a service controller identification of a service controller of the ESS, said providing to occur when associating the STA with the ESS, wherein the service controller comprises a paging or location service controller;
receiving, by the first AP from the STA, a service configuration request that includes a requested service type and a first random number generated by the STA in response to receipt of the service controller identification;
forwarding, by the first AP to the service controller, the service configuration request on behalf of the STA, for the service controller to symmetrically generate a temporal integrity pairwise key (TIPK), the TIPK to facilitate secured control communication between the service controller and the STA using a second access point (AP), the TIPK comprising the first random number and a second random number to be generated by the service controller in response to receipt of the first random number, the TIPK being generated using a service pairwise key (SPK) derived, by at least the service controller, from a distributed key or a pre-shared key (PSK);
receiving from the service controller, by the first AP over a network communication link, a service configuration response that includes the second random number generated by the service controller; and
forwarding to the STA on behalf of the service controller, by the first AP, the service configuration response for the STA to symmetrically generate the TIPK for said secured control communication with the service controller.

2. The method of claim 1, wherein the service configuration request further comprises a medium access control (MAC) address of the STA.

3. The method of claim 1, wherein the TIPK is further generated using bits 256-511 of the distributed key or the PSK, the TIPK comprising the SPK, the SPK comprising: the distributed key or the PSK, at least part of a medium access control (MAC) address of the STA, the service controller identifier (ID), and a length for the SPK.

4. The method of claim 3, wherein the TIPK further comprises a service type identifier, the first and second random numbers, and a length for the TIPK.

5. The method of claim 1, wherein the TIPK provides for secured control communication of broadcast or multicast messages sent between the service controller and the STA using the second AP prior to association of the STA with the second AP.

6. An apparatus comprising:
a transmit block adapted to transmit, for a mobile station (STA) hosting the apparatus, a service configuration request and service control messages to a service controller of an extended service set (ESS) of a wireless network via a first access point (AP) of the ESS, wherein the service controller comprises a paging or location service controller;
a receive block operatively coupled to the transmit block and adapted to receive a service configuration response and service control messages from the service controller via the first AP over a network communication link between the service controller and the first AP; and
a control block operatively coupled to the transmit and receive blocks, the control block being adapted to generate a first random number for inclusion with a service configuration request message that includes a requested service type, on receipt of a service controller identification when associating the STA with the extended service set (ESS), and to symmetrically generate a temporal integrity pairwise key (TIPK) for secured control communication between the service controller and the STA using a second access point (AP), the TIPK comprising the first random number and a second random number received with a service configuration response message, the second random number generated by the service controller in response to the receipt of the first random number, the TIPK being generated using a service pairwise key (SPK) derived, by at least the service controller, from a distributed key or a pre-shared key (PSK).

7. The apparatus of claim 6, wherein the control block is further adapted to generate the SPK, the SPK comprising the distributed key or the PSK, at least part of a medium access control (MAC) address of the STA, a service controller identifier (ID), and a length for the SPK.

8. The apparatus of claim 7, wherein the control block is further adapted to generate the TIPK using bits 256-511 of the distributed key or the PSK, the TIPK comprising the SPK, the first and second random numbers, a service type identifier and a length for the TIPK.

9. The apparatus of claim 6, wherein the TIPK is a location TIPK for a location service provided by the ESS, wherein the location TIPK is to secure a location control message transmitted by the transmit block to the service controller.

10. The apparatus of claim 6, wherein the TIPK is a paging TIPK for a paging service provided by the ESS, wherein the paging TIPK is to secure a paging control message received by the receive block from the service controller.

11. The apparatus of claim 6, wherein the control block is adapted to verify authenticity of control messages received from the service controller, subsequent to generation of the TIPK, by using the TIPK.

12. The apparatus of claim 6, wherein:
the service controller identification is received from the first AP when associating the station with the first A; and
the TIPK provides for secured control communication of broadcast or multicast messages sent between the service controller and the STA using the second AP prior to association of the STA with the second AP.

13. The apparatus of claim 6, wherein at least the transmit and receive blocks are part of a transceiver having at least one common component.

14. A system comprising:
an antenna;
a service controller operatively coupled to the antenna to control a service for an extended service set (ESS) of a wireless network, wherein the service controller comprises a paging or location service controller, the service controller being adapted to receive a service configuration message sent by a mobile station (STA) via a network communication link with a first access point (AP) of the ESS, the service configuration message including a first random number generated by the STA and a requested service type, and to transmit a service configuration response message that includes a second random number to the first AP of the ESS for forwarding to the STA, the service controller being further adapted to generate the second random number and to symmetrically generate a unique temporal integrity pairwise key (TIPK) for secured control message communication between the service controller and the STA using a second access point (AP), the TIPK comprising the first random number and the second random number, the TIPK being generated using a service pairwise key (SPK) derived, by at least the service controller, from a distributed key or a pre-shared key (PSK).

15. The system of claim 14, wherein the service controller is adapted to generate the SPK, the SPK comprising the distributed key or the PSK, at least part of a medium access control (MAC) address of the STA, a service controller identifier (ID), and a length for the SPK, and to generate the TIPK using bits 256-511 of the distributed key or the PSK, the TIPK comprising the SPK, a service type identifier, the first and second random numbers, and a length for the TIPK.

16. The system of claim 14, wherein the TIPK provides for secured control communication of broadcast or multicast messages sent between the service controller and the STA using the second AP prior to association of the STA with the second AP.

17. An article of manufacture comprising:
a memory device or other storage device; and
a plurality of instructions stored in the memory device or the other storage device and designed to enable a mobile station (STA) to perform a plurality of STA operations, a service controller of an extended service set (ESS) of a wireless network to perform a plurality of service controller operations, or both, wherein the service controller comprises a paging or location service controller;
the plurality of STA operations including:
receiving, for a first STA from a first service controller via a network communication link with a first access point (AP), a service controller identification as part of associating the first STA with the ESS;
generating a first random number for the first STA in response to receipt of the service controller identification;
transmitting for the first STA to the first service controller, via the first AP, a first service configuration request that includes the first random number generated by the first STA and a requested service type;
receiving, for the first STA, via the first AP, a first service configuration response that includes a second random number generated by the first service controller in response to receipt of the first random number; and
generating, for the first STA, a first temporal integrity pairwise key (TIPK) for secured control communication between the first service controller and the first STA using a second AP, the first TIPK comprising the first and second random numbers, for secured control message communication between the first STA and the first service controller, the first TIPK being symmetric to a TIPK generated at the first service controller;
the plurality of service controller operations including:
receiving, for a second service controller, a second service configuration request sent by a second STA via a third access point (AP), the service configuration request including a third random number generated by the second STA and a requested service type;
generating by the second service controller a fourth random number, in response to receipt of the third random number;
sending, to the second STA via a network communication link with the third AP, a second service configuration response that includes the fourth random number; and
generating a second TIPK for secured control communication between the second service controller and the second STA using a fourth access point (AP), the second TIPK comprising the third and fourth random numbers to control secured control message communication between the second STA and the second service controller, the second TIPK being symmetric to a TIPK being generated by the second STA;
wherein the first TIPK or the second TIPK are generated using a service pairwise key (SPK) derived, by at least the first or the second service controller, from a distributed key or a pre-shared key (PSK).

18. The article of manufacture of claim 17, wherein the plurality of instructions are further designed to enable the first STA to generate the SPK, the SPK comprising the distributed key or the PSK, at least part of a medium access control (MAC) address of the first STA, a service controller identifier (ID), and a length for the SPK, and to enable the first STA to generate the first TIPK using bits 256-511 of the distributed key or the PSK, the TIPK comprising the SPK, a service type identifier, the first and second random numbers, and a length for the first TIPK; and
wherein the plurality of instructions are further designed to enable the second service controller to generate the SPK, the SPK comprising the distributed key or the PSK, at least part of a medium access control (MAC) address of the second STA, a service controller identifier (ID), and a length for the SPK, and to enable the second service controller to generate the second TIPK using bits 256-511 of the distributed key or the PSK, the TIPK comprising the SPK, a service type identifier, the third and fourth random numbers, and a length for the second TIPK.

19. The article of manufacture of claim 17, wherein the plurality of instructions are further designed to enable the first STA to transmit messages to the first service controller that include the first TIPK, and to verify control messages received from the service controller by using the first TIPK; and
wherein the plurality of instructions are further designed to enable the second service controller to transmit messages to the second STA that include the second TIPK, and to verify control messages received from the STA by using the second TIPK.

20. The article of manufacture of claim 17, wherein the TIPK provides for secured control communication of broadcast or multicast messages sent between the first service controller or the second service controller and the first STA or the second STA using the second AP or the fourth AP to forward the broadcast or multicast messages, prior to association of the first STA or the second STA with the second AP or the fourth AP.

21. The article of manufacture of claim 17, wherein the first and second STA are the same STA, the first and second service controller are the same service controller, the first AP and the third AP are the same AP, the first and third random numbers are the same random number, and the second and fourth random numbers are the same random number.

22. The apparatus of claim 9, wherein the location TIPK is to secure a location control message broadcasted or multicasted by the transmit block to multiple access points that forward the location control message to the service controller.

* * * * *